US012493628B2

(12) United States Patent
Caron et al.

(10) Patent No.: US 12,493,628 B2
(45) Date of Patent: Dec. 9, 2025

(54) SYNCHRONIZATION OF DATA RECORDS

(71) Applicant: AMADEUS S.A.S., Biot (FR)

(72) Inventors: Delphine Caron, Le Rouret (FR); Julien Antoine Emmanuel Cuny, Mouans-Sartoux (FR); David Triscornia, Mouans-Sartoux (FR); Vicente Zepeda Cabral, Nice (FR); Federica Spiriti, Antibes (FR)

(73) Assignee: AMADEUS S.A.S., Biot (FR)

( * ) Notice: Subject to any disclaimer, the term of this patent is extended or adjusted under 35 U.S.C. 154(b) by 666 days.

(21) Appl. No.: 17/428,463

(22) PCT Filed: Jan. 31, 2020

(86) PCT No.: PCT/EP2020/052479
§ 371 (c)(1),
(2) Date: Aug. 4, 2021

(87) PCT Pub. No.: WO2020/161020
PCT Pub. Date: Aug. 13, 2020

(65) Prior Publication Data
US 2022/0107959 A1 Apr. 7, 2022

(30) Foreign Application Priority Data
Feb. 8, 2019 (FR) ...................................... 1901255

(51) Int. Cl.
*G06F 16/00* (2019.01)
*G06F 16/27* (2019.01)
(52) U.S. Cl.
CPC .................................... *G06F 16/27* (2019.01)
(58) Field of Classification Search
CPC .................................................... G06F 16/27
See application file for complete search history.

(56) References Cited

U.S. PATENT DOCUMENTS 6,330,568 B1 * 12/2001 Boothby .............. G06F 16/275
2016/0275135 A1 9/2016 O'Reilly et al.
(Continued)

FOREIGN PATENT DOCUMENTS

CN 103593387 A 2/2014
EP 2280373 A1 2/2011
(Continued)

OTHER PUBLICATIONS

PCT International Search Report, Mar. 19, 2020 re PCT International Patent Application No. PCT/EP2020/052479.
(Continued)

*Primary Examiner* — Khanh B Pham
(74) *Attorney, Agent, or Firm* — Perry + Currier Inc.

(57) ABSTRACT

A method in an aggregator server of synchronizing data records responsive to variable update notifications includes: receiving, from a provider system, an update notification corresponding to a master data object at the provider system; retrieving a record containing a local data object corresponding to the master data object; determining whether the update notification contains update definitions identifying changes to the master data object; selecting between a delta synchronization mode, when the determination is affirmative, and an object comparison synchronization mode, when the determination is negative; for the delta synchronization mode, updating the local data object according to the update definitions; for the object comparison synchronization mode, obtaining a copy of the master data object, and updating the local data object based on a comparison between the local data object and the copy of the master data object; and storing the updated local data object in the record at the aggregator.

19 Claims, 7 Drawing Sheets

(56) References Cited

U.S. PATENT DOCUMENTS

| | | | | |
|---|---|---|---|---|
| 2018/0081956 A1* | 3/2018 | Xu | ......................... | G06F 16/275 |
| 2020/0026714 A1* | 1/2020 | Brodt | ..................... | G06F 16/275 |
| 2022/0269697 A1* | 8/2022 | Sawatzky | ............. | G06F 16/258 |
| 2023/0129099 A1* | 4/2023 | Lee | ..................... | G06F 11/2097 |
| | | | | 707/695 |

FOREIGN PATENT DOCUMENTS

| | | | |
|---|---|---|---|
| WO | 2008020022 A1 | 2/2008 | |
| WO | 2016151400 A1 | 9/2016 | |

OTHER PUBLICATIONS

PCT Written Opinion of the International Searching Authority, Mar. 19, 2020 re PCT International Patent Application No. PCT/EP2020/052479.

\* cited by examiner

SYNCHRONIZATION OF DATA RECORDS

The specification relates generally to data synchronization, and specifically to a system and method for synchronization of data records responsive to variable update notifications.

The provision of various products, including for example travel-related goods and services (e.g. flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the eXtensible Markup Language (XML)-based New Distribution Capability (NDC) standard in the context of travel-related products), they may nonetheless employ different mechanisms to initiate the exchange of data. Variability in synchronization mechanisms can lead to unsuccessful synchronizations, as well as time-consuming and costly configuration on the part of each entity to account for variations in synchronization mechanisms.

An aspect of the specification provides a method of synchronizing data records responsive to variable update notifications, the method comprising: receiving, at an aggregator server, from a provider system, an update notification corresponding to a master data object maintained by the provider system; responsive to receiving the update notification, retrieving a record at the aggregator server containing a local data object that corresponds to the master data object; determining whether the update notification contains update definitions identifying changes to the master data object; selecting between a delta synchronization mode, when the determination is affirmative, and an object comparison synchronization mode, when the determination is negative; when the delta synchronization mode is selected, updating the local data object according to the update definitions; when the object comparison synchronization mode is selected, obtaining a copy of the master data object, and updating the local data object based on a comparison between the local data object and the copy of the master data object; and storing the updated local data object in the record at the aggregator.

In some embodiments, the method comprises transmitting a notification from the aggregator server to a client system.

In some embodiments, the method further comprises storing an update indication in a queue at the aggregator server for retrieval by a client system.

In some embodiments, obtaining a copy of the master data object comprises determining whether the update notification contains the copy of the master data object; and when the update notification does not contain the copy of the master data object, requesting the copy of the master data object from the provider system.

In some embodiments, the method further comprises requesting the copy of the master data object responsive to receiving a request for the record from a client system.

In some embodiments, the method further comprises requesting the copy of the master data object responsive to selecting the object comparison synchronization mode, prior to receiving a request for the record from a client system.

In some embodiments, the method further comprises, responsive to selecting the delta synchronization mode and prior to updating the local data object, determining whether the update definitions and the local data object are compatible.

In some embodiments, determining whether the update definitions and the local data object are compatible comprises, when the update definitions identify a field and define one of a change or a cancellation corresponding to the field; detecting whether the local data object contains the field identified in the update definitions; and when the local data object does not contain the field, generating an error notification.

In some embodiments, the method further comprises responsive to updating the local data object according to the update definitions following selection of the delta synchronization mode, determining whether further changes to the local data object are required.

In some embodiments, determining whether further changes to the local data object are required comprises: selecting and performing the object comparison synchronization mode.

A further aspect of the specification provides an aggregator server for synchronizing data records responsive to variable update notifications, the aggregator server comprising: a communication interface; a memory storing a plurality of local data objects corresponding to respective master data objects maintained by a provider system external to the aggregator server; and a processor interconnected with the communication interface and the memory; the processor configured to: receive, via the communication interface from the provider system, an update notification corresponding to an updated one of the master data objects; responsive to receiving the update notification, retrieve a selected one of the local data objects that corresponds to the updated master data object; determine whether the update notification contains update definitions identifying changes between the updated master data object and the local data object; select between a delta synchronization mode, when the determination is affirmative, and an object comparison synchronization mode, when the determination is negative; when the delta synchronization mode is selected, update the selected local data object according to the update definitions; when the object comparison synchronization mode is selected, obtain a copy of the updated master data object, and update the local data object based on a comparison between the selected local data object and the copy of the updated master data object; and storing the updated local data object in the memory.

In some embodiments, the processor of the aggregator server is further configured to: transmit a notification to a client system.

In some embodiments, the processor of the aggregator server is further configured to: store an update indication in a queue for retrieval by a client system.

In some embodiments, the processor of the aggregator server is configured to obtain a copy of the master data object by: determining whether the update notification contains the copy of the master data object; and when the update notification does not contain the copy of the master data object, requesting the copy of the master data object from the provider system.

In some embodiments, the processor of the aggregator server is further configured to: request the copy of the master data object responsive to receiving a request for the record from a client system.

In some embodiments, the processor of the aggregator server is further configured to: request the copy of the master data object responsive to selecting the object comparison synchronization mode, prior to receiving a request for the record from a client system.

In some embodiments, the processor of the aggregator server is further configured to: responsive to selecting the delta synchronization mode and prior to updating the local data object determine whether the update definitions and the local data object are compatible.

In some embodiments, the processor of the aggregator server is further configured to determine whether the update definitions and the local data object are compatible by, when the update definitions identify a field and define one of a change or a cancellation corresponding to the field: detecting whether the local data object contains the field identified in the update definitions; and when the local data object does not contain the field, generating an error notification.

In some embodiments, the processor of the aggregator server is further configured to: responsive to updating the local data object according to the update definitions following selection of the delta synchronization mode, determine whether further changes to the local data object are required.

In some embodiments, the processor of the aggregator server is further configured to determine whether further changes to the local data object are required by: selecting and performing the object comparison synchronization mode.

A further aspect of the specification provides a non-transitory computer readable medium storing a computer program having instructions, which, when executed by a computing device or system, cause the computing device or system to perform the method of any one of the embodiments set out above.

A further aspect of the specification provides a computer program product comprising program instructions stored on a computer readable medium to execute the method steps according to any one of the embodiments set out above when said program is executed on a computer.

Embodiments are described with reference to the following figures, in which.

Figure 1:
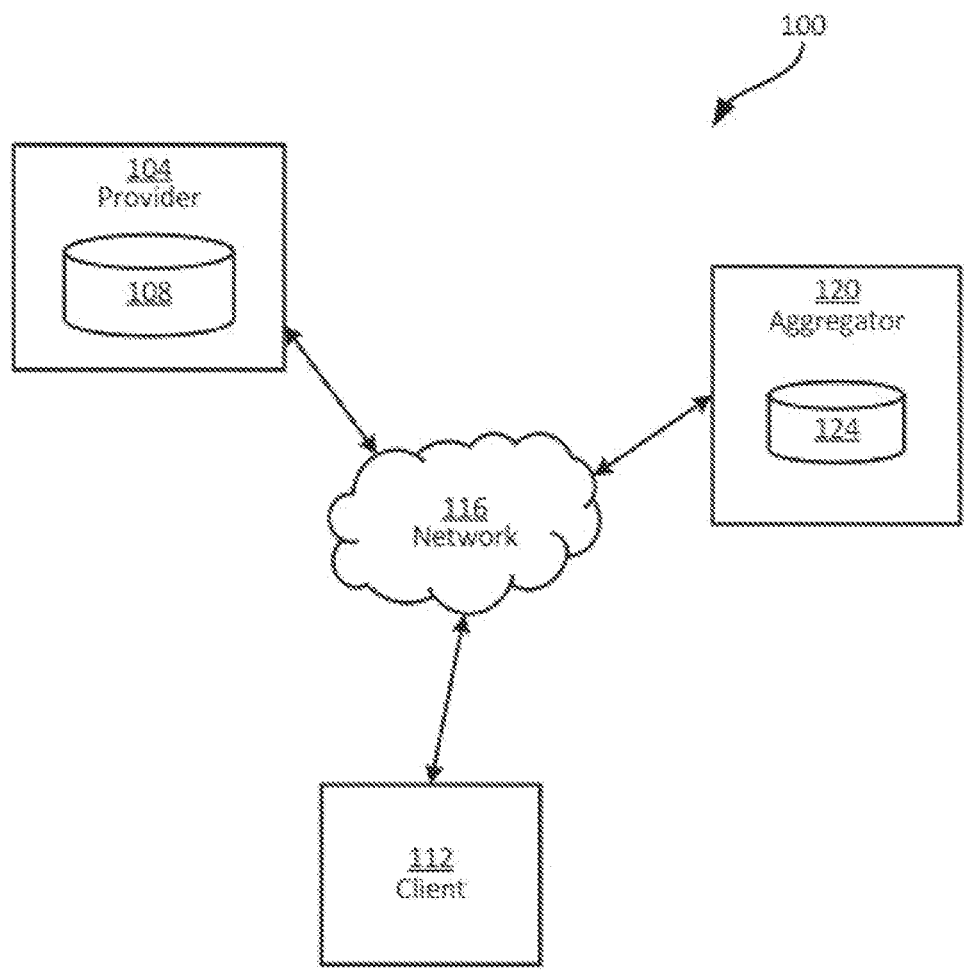
FIG. 1 depicts a system for synchronizing data records.

FIG. 1 depicts a system 100 for synchronizing data records. The data records, in the embodiments discussed herein, correspond to products such as travel related goods and services (e.g. flights, hotel reservations, car rentals and the like). More specifically, the products discussed in the examples below are flight tickets and related services (e.g. baggage check services, in-flight food, entertainment and the like). However, as will be apparent to those skilled in the art, the systems and methods discussed below can also be applied to various other types of data records.

Delivery of the products mentioned above is typically controlled by a provider entity, such as an airline in the case of the products discussed in connection with the examples provided herein. The system 100 includes a provider system 104 (e.g. one or more servers or other suitable computing devices), which in this example is operated by the provider entity. The system 100 can include a plurality of provider systems 104, each operated by respective provider entities (e.g. other airlines), although only one provider system 104 is shown for illustrative purposes. The provider system 104 stores a repository 108 containing a plurality of master data objects. The master data objects may also be referred to as passenger name records (PNRs) in the context of Global Distribution System (GDS)-based data exchange, or Order records in the context of NDC-based data exchange.

Each master data object defines a product, or a combination of products, that have been purchased (e.g. by end users of the products). Thus, in the examples discussed below, each master data object defines a flight operated by the provider entity, and/or ancillary services associated with the flight. Each master data object therefore contains various fields. Certain fields define product attributes, such as product identifiers (e.g. service identifiers, item identifiers and the like), locations, dates and times corresponding to the products (e.g. flight times and other itinerary data). Other fields of the master data object defines client attributes, such as client identifiers (e.g. identifying the traveler, in the case of travel-related products such as the above-mentioned flights), payment data, and the like.

Master data objects are generated for storage in the repository 108 in response to purchase requests (which may also be referred to as orders) received at the provider system 104 from other elements of the system 100. For example, the requests may be received from a client system 112, via a network 116 (e.g. any suitable combination of local and wide area networks, including the Internet). The client system 112, in the present example, is operated by a travel agent entity, and therefore generates and transmits requests to purchase products to the provider system 108 on behalf of end users (e.g. travelers). The system 100 can include a plurality of client systems 112, although only one client system 112 is shown in FIG. 1 for illustrative purposes.

Various other mechanisms for initiating the creation of the master data objects in the repository 108 are also contemplated. For example, end users (via additional computing devices not shown in FIG. 1) may initiate the creation of the master data objects via direct interaction with a website hosted by the provider system 104, rather than through the client system 112. Various mechanisms for the creation of master data objects in the repository 108 will be apparent to those skilled in the art, such as the "offer" and "order" mechanisms specified by the NDC standard. The creation of master data objects in response to product purchase requests is not discussed in further detail herein.

The client system 112 is configured to obtain data contained in the master data objects stored in the repository 108. Data obtained by the client system 112 may be presented to users served by the client system 112, and may also be manipulated at the client system 112 to initiate update requests for transmission to the provider system 104 (e.g. to change a flight reservation). In other words, the system 100 enables the client system 112 to initiate updates to the master data objects of the repository 108. The client system 112 may be configured to initiate such updates by transmitting requests, directly or indirectly, to the provider system 104. A wide variety of updates may be requested by the client system 112 according to any suitable data exchange mechanism, such as those specified by the NDC standard. Examples of such updates include cancellations, modifications of dates and/or times corresponding to a purchased ticket, purchase of additional products such as services ancillary to a flight, and the like.

Updates to the master data objects in the repository 108 can also be initiated by the provider system 104 itself, in the absence of a request from the client system 112. Such updates may include flight rescheduling, cancellations, and the like. Such updates must typically be communicated to the client system 112 to enable the client system 112 to notify end users, request further changes to accommodate the provider-initiated updates, and the like. As noted above, the system 100 may include a plurality of provider systems 104. Each provider system 104 may implement a different mechanism for communicating provider-initiated updates to the relevant client system 112. The system 100 therefore also includes an aggregator server 120, implemented as one or more (e.g. geographically distributed) logically linked computing devices. The aggregator server 120, also referred to herein simply as the aggregator 120, is configured to intermediate between provider systems (e.g. the provider system 104) and client systems (e.g. the client system 112).

As will be discussed below, specifically in the context of provider-initiated updates, rather than updates to the repository 108 being communicated directly to the client system 112, the updates are communicated to the aggregator 120 from the provider system 104. The aggregator 120, in turn, is configured to detect which update mechanism is employed by the provider system 104, and to process the updated data accordingly for provision to the client system 112. The client system 112 is therefore relieved of the requirement to accommodate various update mechanisms, and instead need only retrieve data from the aggregator 120 for presentation and manipulation.

The aggregator 120 maintains a local repository 124. The local repository 124 contains local copies (also referred to herein as local data objects) of at least a subset of the master data objects in the repository 108. As will be discussed in greater detail below, the aggregator 120 is configured, responsive to provider-initiated updates to the repository 108, to synchronize the local data objects with the master data objects, enabling provision of up-to-date local data objects to the client system 112. In particular, the aggregator 120 is configured to detect one of a number of synchronization mechanisms employed by the provider system 104, and to process update notifications from the provider system 104 according to the detection, permitting updates to be conveyed to the client system 112 according to a consistent mechanism, regardless of which update notification mechanism the provider system 104 (or any other provider system) employs.

Figure 2:
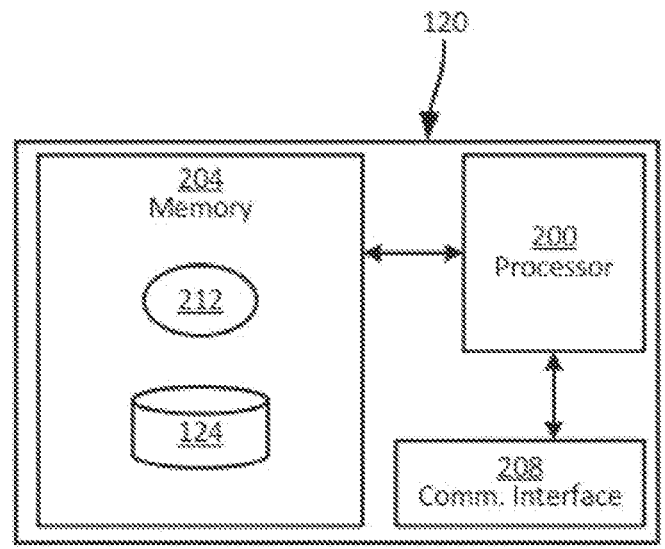
FIG. 2 depicts certain internal components of the aggregator server of FIG. 1.

Turning to FIG. 2, before discussing the functionality of the system 100 in greater detail, certain components of the aggregator 120 will be discussed in greater detail.

As shown in FIG. 2, the aggregator 120 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communication interface 208, which enables the aggregator 120 to communicate with the other computing devices of the system 100 (i.e. the provider system 104 and the client system 112) via the network 116. The communication interface 208 therefore includes any necessary components (e.g. network interface controllers (NICs), radio units, and the like) to communicate via the network 116. The specific components of the communication interface 208 are selected based on upon the nature of the network 116. The aggregator 120 can also include input and output devices connected to the processor 200, such as keyboards, mice, displays, and the like (not shown).

The components of the aggregator 120 mentioned above can be deployed in a single enclosure, or in a distributed format. In some examples, therefore, the aggregator 120 includes a plurality of processors, either sharing the memory 204 and communication interface 208, or each having distinct associated memories and communication interfaces.

The memory 204 stores the local repository 124 introduced in connection with FIG. 1. The memory 204 also stores a plurality of computer-readable programming instructions, executable by the processor 200, in the form of various applications, including a synchronization application 212. As will be understood by those skilled in the art, the processor 200 executes the instructions of the application 212 (and any other suitable applications) in order to perform various actions defined by the instructions contained therein. In the description below, the processor 200, and more generally the aggregator 120, are said to be configured to perform those actions. It will be understood that they are so configured via the execution (by the processor 200) of the instructions of the applications stored in memory 204. Execution of the synchronization application 212, as will be discussed below, configures the aggregator 120 to receive update notifications from the provider system 104 defining provider-initiated updates to the repository 108, and to process the update notifications to synchronize the local repository 124 with the repository 108. Execution of the synchronization application 212 further configures the aggregator 120 to notify the client system 112 when the above-noted synchronization process is complete.

Figure 3:
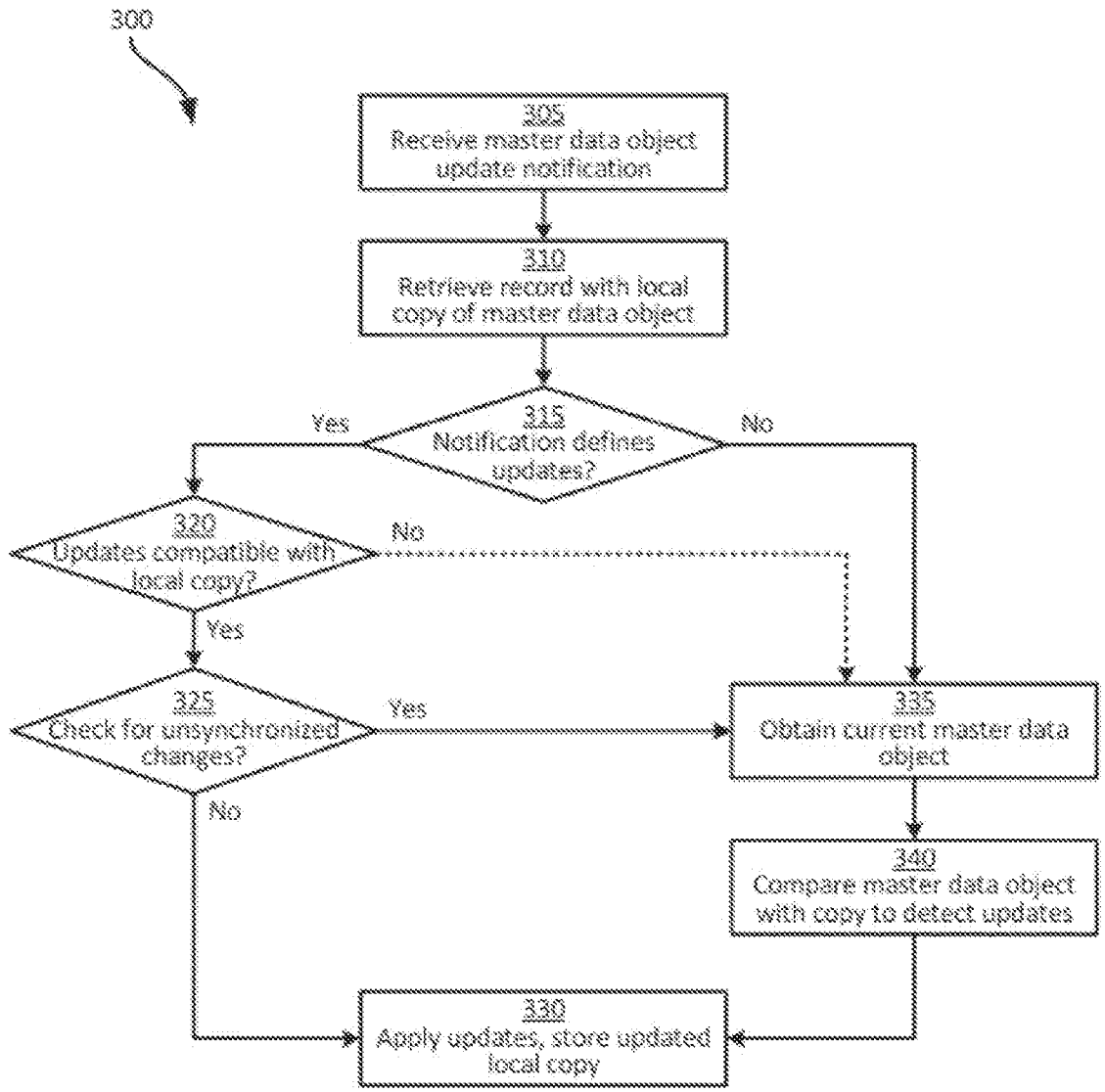
FIG. 3 depicts a method of synchronizing data records responsive to variable update notifications in the system of FIG. 1.

Turning now to FIG. 3, certain aspects of the operation of the system 100 will be described in greater detail. Specifically, FIG. 3 illustrates a method 300 of synchronizing data records responsive to variable update notifications. The method 300 will be described in conjunction with its performance within the system 100. In particular, the blocks of the method 300 are performed by aggregator 120 via the execution of the synchronization application 212 by the processor 200.

At block 305, the aggregator 120 is configured to receive an update notification from the provider system 104. The update notification corresponds to one of the master data objects maintained by the provider system 104 in the repository 108. In general, the update notification contains at least an identifier (which may also be referred to as an order identifier or order ID) of the corresponding master data object. As will be discussed below in greater detail, depending on the update mechanism employed by the provider system 104, the update notification may, but does not necessarily, also contain other data.

Responsive to receiving the update notification at block 305, the aggregator 120 is configured to retrieve a record from the local repository 124 that contains the local data object corresponding to the master data object identified in the update notification. The local data objects in the local repository 124, as noted above, contain copies of the master data objects in the repository 108, and thus at block 310 the aggregator 120 is configured to retrieve the local data object having the same order ID as the order ID in the update notification. If the local repository 124 does not contain a local data object having the relevant order ID, the aggregator 120 can be configured to generate an error message, e.g. for transmission to an administrator.

Having successfully retrieved the relevant local data object at block 310, the aggregator 120 is configured to proceed to block 315. At block 315, the aggregator 120 is configured to select between distinct synchronization modes, based on the content of the update notification from block 305. As will be discussed in greater detail below, in some performances of the method 300, the update notification may contain update definitions identifying changes to the master data object. Update definitions identify individual attributes in the master data object that have been altered by the provider system 104. In other instances, however, the update notification may not contain such update definitions. Instead, the update notification may simply contain a complete copy of the master data object (including both updated attributes and attributes that have not been updated). In further examples, the update notification may contain neither update definitions nor a full copy of the master data object.

At block 315, the aggregator 120 is configured to determine whether the update notification includes update definitions, as mentioned above. Update definitions are typically indicated in the update notification, for example between predefined formatting elements (e.g. specific fields in an XML-based format), and the aggregator 120 is therefore configured, at block 315, to examine the update notification for the presence of such predefined formatting elements. In some embodiments, the performance of block 315 can precede the performance of block 310. That is, it is not necessary to retrieve the relevant local data object before performing block 315. When the update notification does contain update definitions (i.e. when the determination at block 315 is affirmative), the aggregator 120 is configured to select a delta synchronization mode for processing the update notification. When, on the other hand, the update notification does not contain update definitions (i.e. when the determination at block 315 is negative), the aggregator 120 is configured to select an object comparison synchronization mode for processing the update notification. The two above-mentioned modes will be discussed in detail below.

Figure 4:
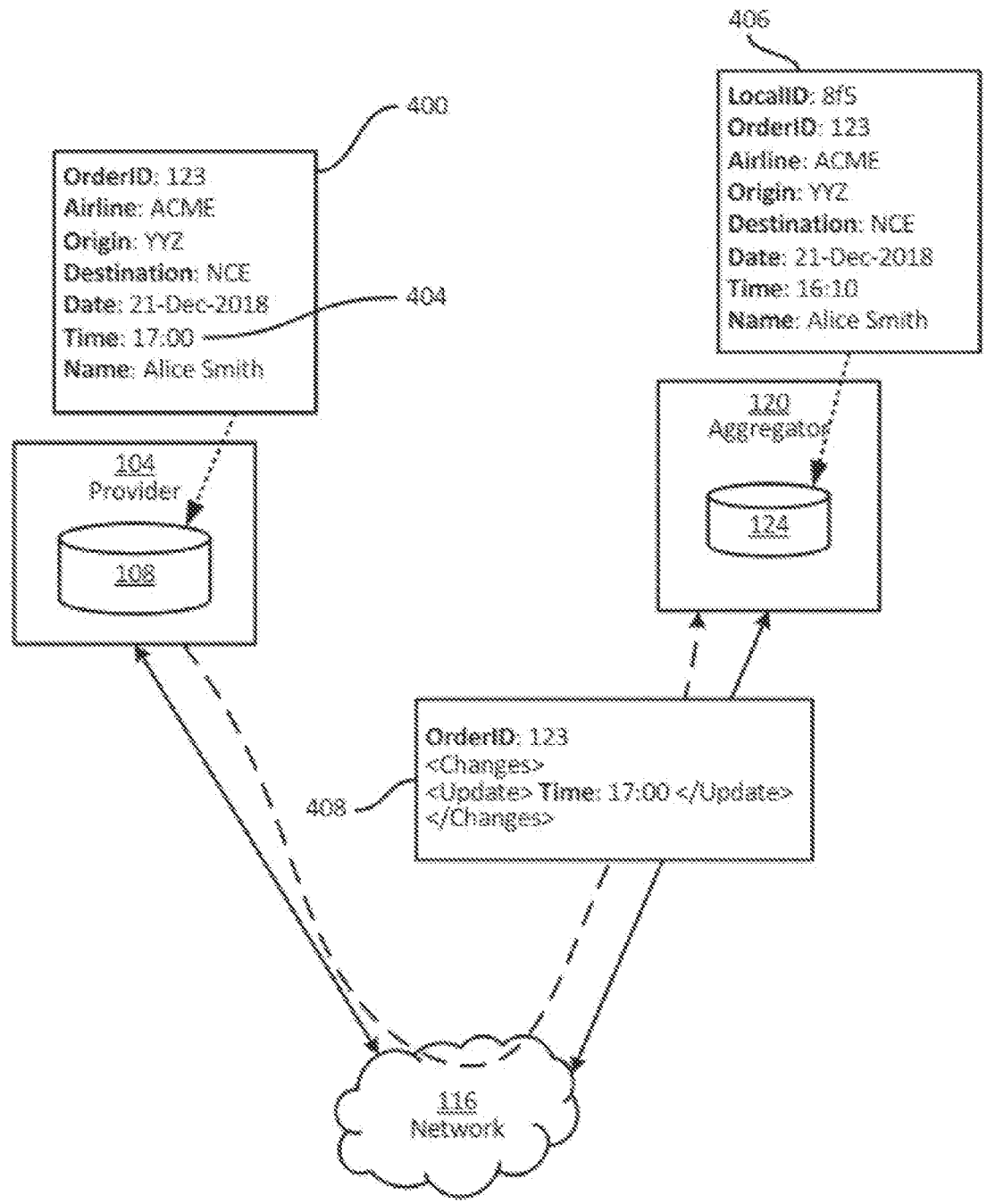
FIG. 4 depicts a portion of the system of FIG. 1 during the performance of blocks 305-315 of the method of FIG. 3.

Referring to FIG. 4, a portion of the system 100 (excluding the client system 112) is shown, illustrating an example performance of blocks 300, 310 and 315. In particular, the provider system 104 is assumed to have updated a master data object 400 stored in the repository 108. In particular, the master data object 400 defines a flight reservation for a user named Alice Smith. The flight is operated by the airline ACME (presumed to also be the operator of the provider system 104), and departs Toronto (YYZ) on Dec. 21, 2018 towards Nice (NCE). The master data object 400 is assumed to have been updated to change the departure time of the flight from 16:10 to 17:00. As will now be apparent, numerous other master data objects in the repository 108, corresponding to all other reservations for the same flight, will also have been updated responsive to the change in departure time. Because the update to the departure time has not yet been synchronized with the local repository 124 at the aggregator 120, a corresponding local data object 406 still contains the now-outdated departure time of 16:10.

As also illustrated in FIG. 4, the local data object 406 contains a copy (albeit an outdated copy) of the master data object 400, but may also contain additional data such as a local identifier assigned to the local data record 406 by the aggregator 120. Various other fields may also be contained in the local data record, including information provided to the aggregator 120 by the client system 112. Such information is stored in the local data record 406, but is exempt from the synchronization mechanisms discussed herein.

The provider system 104 is configured to generate an update notification 408 for transmission to the aggregator 120 via the network 116 in response to the above-mentioned update to the master data object 400. As shown in FIG. 4, in this example the update notification does not contain the complete master data object 400. Instead, the update notification contains the order ID of the master data object 400, and update definitions marked by the "<changes>" element, indicating that the departure time of the flight has been updated. For example, the "<update>" element indicates a change to an existing attribute (e.g. the "time" field). Other elements, such as a "<cancel>", "<delete>" or other suitable element can be employed to signal the removal of an attribute or product (i.e. set of attributes) from the master data object 400. Still further elements, such as an "<add>" element, can be employed to indicate the addition of an attribute to the master data object 400 that was previously not present. The determination at block 315 in the present example is therefore affirmative, and the aggregator 120 is configured to select the delta synchronization mode for processing of the update notification 408.

Returning to FIG. 3, having selected the delta synchronization mode at block 315 (i.e. a "yes" determination as illustrated in FIG. 3), the aggregator 120 is configured to update the local data object 406 according to the update definitions. In particular, the aggregator 120 is configured to proceed to block 320, and determine whether the update definitions in the notification 408 are compatible with the local data object 406. The determination at block 320 seeks to detect de-synchronization of the local data object 405 with the master data object 400 predating the update notification 408. In particular, at block 320 the aggregator 120 is configured to determine whether the local data object 408 contains the field identified in the update definitions of the notification 408. In the present example, as seen in FIG. 4, the update notification 408 defines a change to the "Time" field, which is also contained in the local data object 406. The determination at block 320 is therefore affirmative, and the performance of the method 300 proceeds to block 325.

A negative determination at block 320 is made when the update definitions specify a change or a deletion (e.g. a cancellation of a service) to a field that does not exist in the local data object 406. For example, an update notification defining a change to a baggage check service for the flight shown in FIG. 4 (e.g. from one checked bag to two checked bags) is determined to be incompatible, as the local data object 406 does not contain any indication of a checked baggage service. The determination at block 320 in this example is negative, and the aggregator 120 is configured to initiate an error handling procedure. The error handling procedure can include obtaining a complete copy of the master data object 400, generating an alert to an administrator and/or to the client system 112, or the like.

As will now be apparent, other update definitions may specify insertions to the master data object 400, which require inserting fields not previously present in the local data object 405 to synchronize the local data object 406 with the master data object. Assessing compatibility for insertions can include detecting an incompatibility when the corresponding field already exists in the local data object 406.

Continuing with the example of FIG. 4, in which the determination at block 320 is affirmative, at block 325 the aggregator 120 is configured to determine whether to check for other unsynchronized changes. Unsynchronized changes, in this discussion, are changes to the master data record 400 that are not reflected in the update notification 408. For example, a previous synchronization error (e.g. due to a loss of communication between the provider system 104 and the aggregator 120) may have resulted in a change to the master data object 400 not being successfully synchronized to the local repository 124. The determination at block 325 can be based on any of a variety of factors. For example, in some embodiments the aggregator 120 is configured to always check for unsynchronized changes (i.e. the determination at block 325 is automatically affirmative). In other embodiments, the determination can be based on a time elapsed since the previous check for unsynchronized changes.

In further embodiments, the determination at block 325 is made based on the contents of the update notification received at block 305. Specifically, when the update notification received at block 305 contains not only the update definitions mentioned above, but also a copy of the master data object 400, the determination at block 325 is affirmative. In contrast, when the update notification contains update definitions but does not contain a copy of the master data object 400 (as illustrated in FIG. 4), the determination at block 325 is negative. Following an affirmative determination at block 325, the aggregator 120 is configured to proceed to block 335, which will be discussed below as an element of an object comparison synchronization mode. Following a negative determination at block 325, the aggregator 120 is configured to proceed to block 330 of the method 300.

Figure 5:
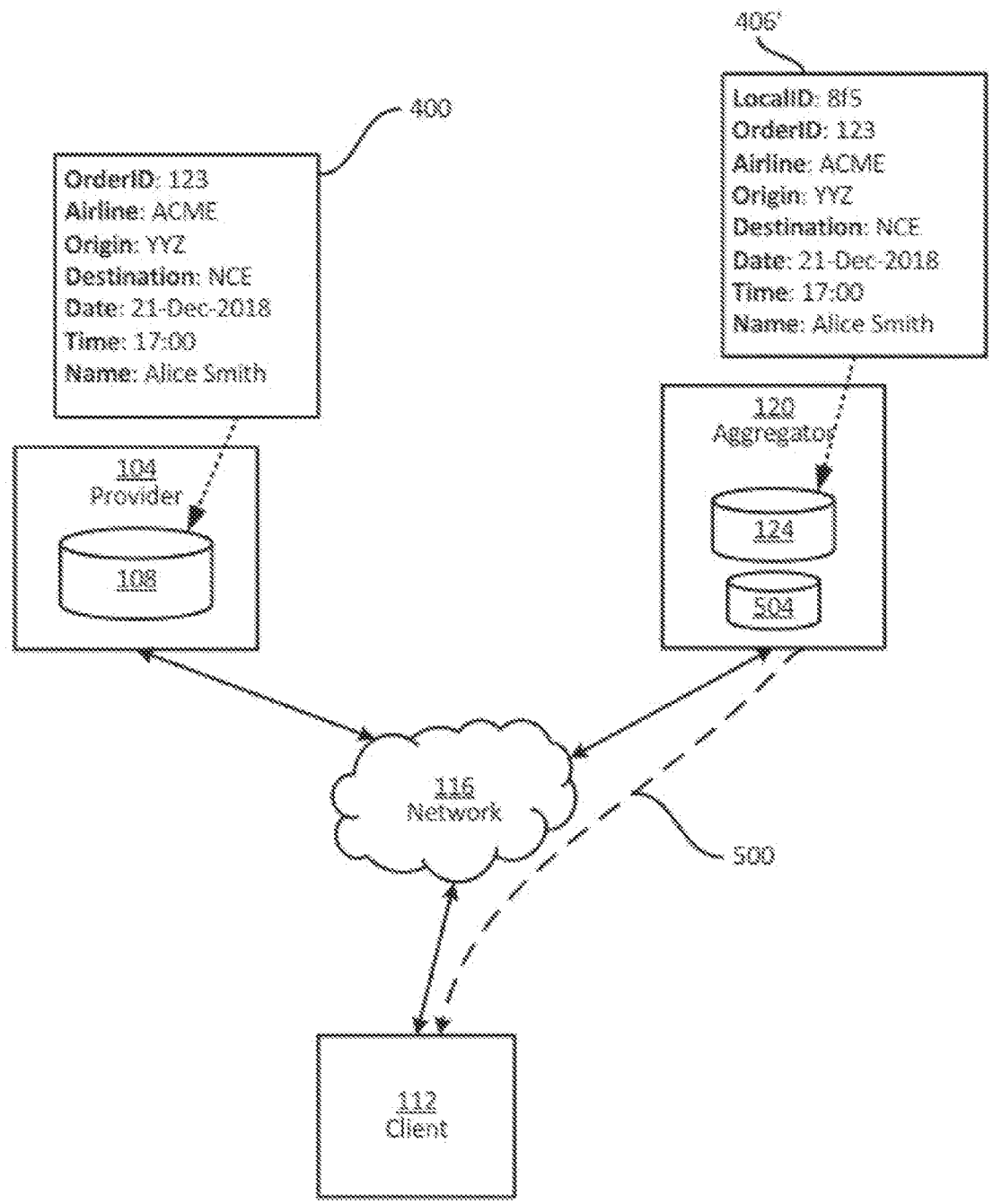
FIG. 5 depicts the system of FIG. 1 upon completion of the method of FIG. 3.

At block 330, the aggregator 120 is configured to apply the updates—in the present example, the updates specified by the update definitions in the notification 408—and to store an updated local copy of the master data object 400. As shown in FIG. 5, following the performance of block 330, the local repository 124 contains an updated local data object 406' in place of the local data object 406 shown in FIG. 4. As seen in FIG. 5, the updated local data object 406' contains the updated departure time of 17:00, as specified in the update notification 408.

At block 330, the aggregator 120 can also be configured to notify the client system 112 of the updates applied to the local repository 124. For example, referring to FIG. 5, the aggregator 120 can be configured to transmit a notification 500 to the client system 112. The notification 500 can contain the updated local data object 406', or can simply contain an indicator that the local data object 406' has been updated, prompting the client system 112 to subsequently retrieve the local data object 406'. Various forms of notification can be employed, such as the generation of an email for transmission to an email address associated with the client system 112. In other examples, the aggregator 120 can place an indicator (e.g. the order ID of the local data object 406') in a queue 504 for periodic retrieval by the client system 112. In other words, the transmission of the local data object to the client system 112 can be pulled by the client system 112 rather than pushed to the client system 112.

Figure 6:
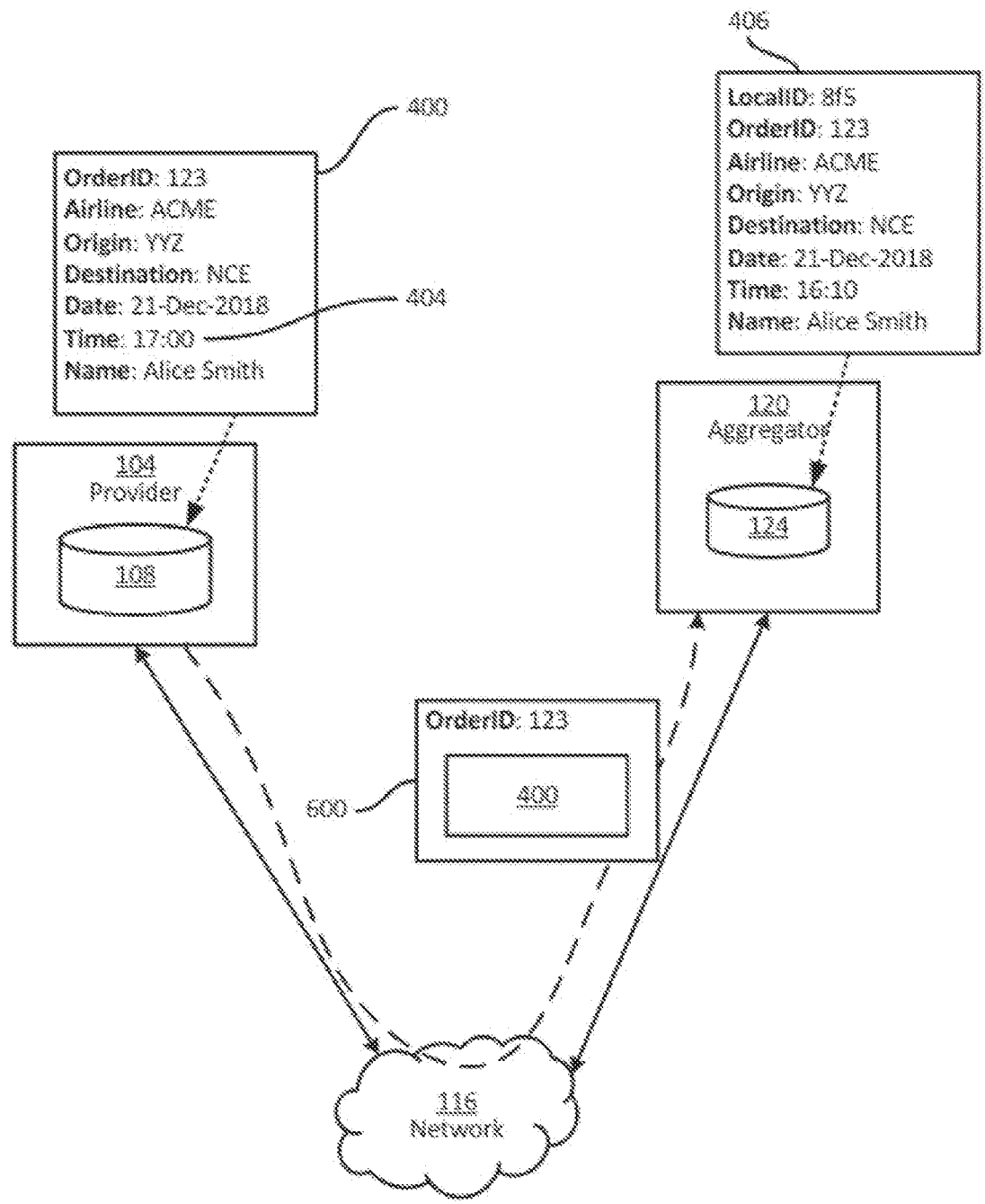
FIG. 6 depicts a portion of the system of FIG. 1 during another performance of blocks 305-315 of the method of FIG. 3.

Returning to FIG. 3, the object comparison synchronization mode mentioned above will now be discussed in greater detail. When the determination at block 315 is negative, indicating that the update notification received at block 305 does not contain update definitions, the aggregator 120 proceeds to block 335 instead of block 320. Referring to FIG. 6, the same master and local data objects 400 and 406, respectively, are illustrated as in FIG. 4. However, rather than the update notification 408 containing update definitions (but no copy of the master data object 400), in the example of FIG. 6 the provider system 104 transmits an update notification 600 to the aggregator 104 containing a complete copy of the master data object 400. Of particular note, while the update notification 600 includes a copy of the master data object 400, the update notification 600 does not contain update definitions specifying which changes precipitated the transmission of the update notification 600 (i.e. the change to the departure time, in the present example).

The determination at block 315 is therefore negative, and the aggregator 120 selects the object comparison synchronization mode for processing the update notification 600. In the object comparison synchronization mode, the aggregator 120 is configured to obtain a current copy of the master data object 400 at block 335. Various mechanisms are contemplated by which the aggregator 120 obtains the master data object 400. In the example of FIG. 6, the master data object 400 is received with the update notification 600 itself, and therefore the performance of block 335 necessitates only extracting the master data object 400 from the update notification 600.

Figure 7:
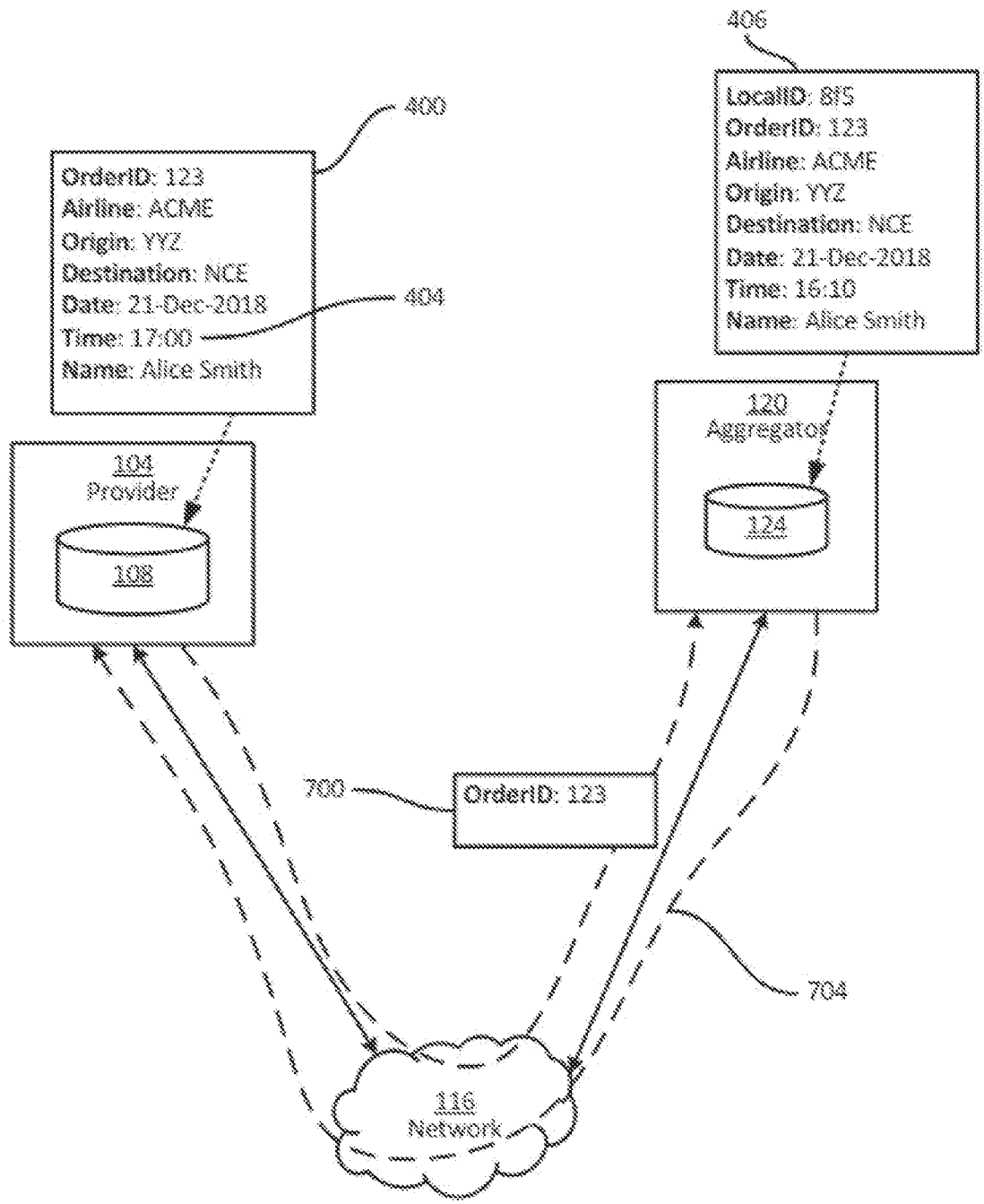
FIG. 7 depicts a portion of the system of FIG. 1 during another performance of blocks 305-315 and 335 of the method of FIG. 3.

In ether examples, as shown in FIG. 7, the update notification does not contain a copy of the master data object 400. As illustrated in FIG. 7, responsive to the same changes discussed above, the provider system 104 transmits an update notification 700 to the aggregator 120. The update notification 700 does not contain update definitions, leading to a negative determination at block 315 (and selection of the object comparison synchronization mode). The update notification 700 also does not contain a copy of the master data object 400, however. At block 335, the aggregator 120 is therefore configured to obtain the copy of the master data object 400 by transmitting a request 704 to the provider system 104, e.g. containing the order ID from the update notification 700.

Transmission of the request 704 need not immediately follow the negative determination at block 315. In some examples, the aggregator 120 is configured to notify the client system 112 that an update has occurred (e.g. via the pushed notification 500 or placement of a notification in the queue 504, as discussed in connection with FIG. 5). The aggregator 120 is then configured to wait until the client system 112 requests the local data object 406 to transmit the request 704.

Returning to FIG. 3, having obtained the copy of the master data object 400, the aggregator 120 is configured to perform block 340. At block 340 the aggregator 120 compares the master data object 400 to the local data object 406 to detect updates not currently reflected in the local data object 406. That is, each field of the master data object is compared to the corresponding field of the local data object 406, and vice versa, to identify any changes, additions, deletions, and the like to be synchronized to the local data object 406. Having detected and applied any updates to the local data object 406 (i.e. to yield the updated local data object 406' as shown in FIG. 5), the aggregator 120 is configured to proceed to block 330, as discussed above.

Those skilled in the art will appreciate that in some embodiments, the functionality of the application 212 may be implemented using pre-programmed hardware or firmware elements (e.g., application specific integrated circuits (ASICs), electrically erasable programmable read-only memories (EEPROMs), etc.), or other related components.

The scope should not be limited by the embodiments set forth in the above examples, but should be given the broadest interpretation consistent with the description as a whole.

The invention claimed is:

1. A method of synchronizing data records responsive to variable update notifications, the method comprising:
   storing, in a memory of an aggregator server, a plurality of local data objects corresponding to respective master data objects maintained by a provider system external to the aggregator server;
   receiving, at the aggregator server, from the provider system, an update notification corresponding to an updated one of the master data objects maintained by the provider system;
   responsive to receiving the update notification, retrieving, at the aggregator server, a selected one of the local data objects that corresponds to the updated master data object;
   determining whether the update notification contains update definitions identifying changes to the master data object;
   selecting between a delta synchronization mode, when the determination is affirmative, and an object comparison synchronization mode, when the determination is negative;
   when the delta synchronization mode is selected, updating the local data object according to the update definitions;
   when the object comparison synchronization mode is selected, obtaining a copy of the master data object, and updating the local data object based on a comparison between the local data object and the copy of the master data object;
   storing the updated local data object at the aggregator; and
   transmitting a notification from the aggregator server to a client system.

2. The method of claim 1, further comprising:
   storing an update indication in a queue at the aggregator server for retrieval by a client system.

3. The method of claim 1, wherein obtaining a copy of the updated master data object comprises:
   determining whether the update notification contains the copy of the updated master data object; and
   when the update notification does not contain the copy of the updated master data object, requesting the copy of the updated master data object from the provider system.

4. The method of claim 3, further comprising:
   requesting the copy of the updated master data object responsive to receiving a request for the selected local data object from a client system.

5. The method of claim 3, further comprising:
   requesting the copy of the updated master data object responsive to selecting the object comparison synchronization mode, prior to receiving a request for the selected local data object from a client system.

6. The method of claim 1, further comprising:
   responsive to selecting the delta synchronization mode and prior to updating the selected local data object, determining whether the update definitions and the selected local data object are compatible.

7. The method of claim 6, wherein determining whether the update definitions and the selected local data object are compatible comprises, when the update definitions identify a field and define one of a change or a cancellation corresponding to the field:
   detecting whether the selected local data object contains the field identified in the update definitions; and
   when the selected local data object does not contain the field, generating an error notification.

8. The method of claim 1, further comprising:
   responsive to updating the selected local data object according to the update definitions following selection of the delta synchronization mode, determining whether further changes to the selected local data object are required.

9. The method of claim 8, wherein determining whether further changes to the selected local data object are required comprises: selecting and performing the object comparison synchronization mode.

10. An aggregator server for synchronizing data records responsive to variable update notifications, the aggregator server comprising:
    a communication interface;
    a memory storing a plurality of local data objects corresponding to respective master data objects maintained by a provider system external to the aggregator server; and
    a processor interconnected with the communication interface and the memory; the processor configured to:
      receive, via the communication interface from the provider system, an update notification corresponding to an updated one of the master data objects;
      responsive to receiving the update notification, retrieve a selected one of the local data objects that corresponds to the updated master data object;
      determine whether the update notification contains update definitions identifying changes between the updated master data object and the local data object;
      select between a delta synchronization mode, when the determination is affirmative, and an object comparison synchronization mode, when the determination is negative;
      when the delta synchronization mode is selected, update the selected local data object according to the update definitions;
      when the object comparison synchronization mode is selected, obtain a copy of the updated master data object, and update the selected local data object based on a comparison between the selected local data object and the copy of the updated master data object;
      store the updated local data object in the memory; and
      transmit a notification to a client system.

11. The aggregator server of claim 10, wherein the processor is further configured to: store an update indication in a queue for retrieval by a client system.

12. The aggregator server of claim 10, wherein the processor is configured to obtain a copy of the updated master data object by:
    determining whether the update notification contains the copy of the updated master data object; and
    when the update notification does not contain the copy of the updated master data object, requesting the copy of the updated master data object from the provider system.

13. The aggregator server of claim 12, wherein the processor is further configured to: request the copy of the updated master data object responsive to receiving a request for the selected local data object from a client system.

14. The aggregator server of claim 12, wherein the processor is further configured to: request the copy of the updated master data object responsive to selecting the object comparison synchronization mode, prior to receiving a request for the selected local data object from a client system.

15. The aggregator server of claim 10, wherein the processor is further configured to: responsive to selecting the delta synchronization mode and prior to updating the selected local data object, determine whether the update definitions and the selected local data object are compatible.

16. The aggregator server of claim 15, wherein the processor is further configured to determine whether the update definitions and the selected local data object are compatible by, when the update definitions identify a field and define one of a change or a cancellation corresponding to the field:
  detecting whether the selected local data object contains the field identified in the update definitions; and
  when the selected local data object does not contain the field, generating an error notification.

17. The aggregator server of claim 10, wherein the processor is further configured to: responsive to updating the selected local data object according to the update definitions following selection of the delta synchronization mode, determine whether further changes to the selected local data object are required.

18. The aggregator server of claim 17, wherein the processor is further configured to determine whether further changes to the selected local data object are required by: selecting and performing the object comparison synchronization mode.

19. A non-transitory computer readable medium storing a computer program having instructions executable by a computing device to:
  store a plurality of local data objects corresponding to respective master data objects maintained by a provider system external to the computing device;
  receive, via a communication interface of the computing device from the provider system, an update notification corresponding to an updated one of the master data objects;
  responsive to receiving the update notification, retrieve a selected one of the local data objects that corresponds to the updated master data object;
  determine whether the update notification contains update definitions identifying changes between the updated master data object and the local data object;
  select between a delta synchronization mode, when the determination is affirmative, and an object comparison synchronization mode, when the determination is negative;
  when the delta synchronization mode is selected, update the selected local data object according to the update definitions;
  when the object comparison synchronization mode is selected, obtain a copy of the updated master data object, and update the selected local data object based on a comparison between the selected local data object and the copy of the updated master data object;
  store the updated local data object in the memory; and
  transmit a notification to a client system.

* * * * *